United States Patent
Krause et al.

(10) Patent No.: US 7,455,817 B2
(45) Date of Patent: Nov. 25, 2008

(54) COMPACT FUEL PROCESSOR FOR PRODUCING A HYDROGEN RICH GAS

(75) Inventors: Curtis L. Krause, Houston, TX (US); James K. Wolfenbarger, La Canada, CA (US); Paul F. Martin, Toronto (CA)

(73) Assignee: Texaco Inc., San Ramon, CA (US)

(*) Notice: Subject to any disclaimer, the term of this patent is extended or adjusted under 35 U.S.C. 154(b) by 588 days.

(21) Appl. No.: 10/006,963

(22) Filed: Dec. 5, 2001

(65) Prior Publication Data
US 2002/0094310 A1    Jul. 18, 2002

Related U.S. Application Data
(60) Provisional application No. 60/251,226, filed on Dec. 5, 2000.

(51) Int. Cl.
*B01J 8/04* (2006.01)
(52) U.S. Cl. ............ 422/191; 422/193; 422/200; 422/177; 422/195; 422/198; 48/127.9; 48/127.7; 48/198.1; 48/198.7; 429/17; 429/20; 429/26; 429/19; 252/373
(58) Field of Classification Search ........... 422/177, 422/191; 48/127.9; 29/890; 585/443
See application file for complete search history.

(56) References Cited

U.S. PATENT DOCUMENTS

| | | | |
|---|---|---|---|
| 3,572,046 A | 3/1971 | Grotz | |
| 3,653,846 A | 4/1972 | Kubec et al. | |
| 3,720,602 A | 3/1973 | Riley et al. | |
| 3,729,936 A | 5/1973 | De Palma et al. | |
| 3,838,994 A | 10/1974 | Aldridge | |
| 3,909,299 A | 9/1975 | Corrigan | |
| 3,996,016 A | 12/1976 | Wagner | |
| 4,363,654 A | 12/1982 | Frederick et al. | |
| 4,405,562 A | 9/1983 | Zardi et al. | |
| 4,522,894 A | 6/1985 | Hwang et al. | |
| 4,876,409 A | 10/1989 | Leyshon et al. | |
| 4,976,747 A | 12/1990 | Szydlowski et al. | |
| 5,132,007 A | 7/1992 | Meyer et al. | |
| 5,209,906 A | 5/1993 | Watkins et al. | |
| 5,248,566 A | 9/1993 | Kumar et al. | |
| 5,330,727 A | 7/1994 | Trocciola et al. | |
| 5,385,712 A | 1/1995 | Sprunk | |
| 5,387,399 A * | 2/1995 | Nishida et al. | 422/171 |
| 5,656,494 A | 8/1997 | Kant et al. | |
| 5,725,756 A | 3/1998 | Subramaniam et al. | |
| 5,874,051 A | 2/1999 | Heil et al. | |

(Continued)

*Primary Examiner*—Alexa Neckel
*Assistant Examiner*—Kaity V. Handal
(74) *Attorney, Agent, or Firm*—Howrey Simon; Frank C. Turner; Melissa Patangia

(57) ABSTRACT

An apparatus for carrying out a multi-step process of converting hydrocarbon fuel to a substantially pure hydrogen gas feed includes a plurality of modules stacked end-to-end along a common axis. Each module includes a shell having an interior space defining a passageway for the flow of gas from a first end of the shell to a second end of the shell opposite the first end, and a processing core being contained within the interior space for effecting a chemical, thermal, or physical change to a gas stream passing axially through the module. the multi-step process includes: providing a fuel processor having a plurality of modules stacked end-to-end along a common axis; and feeding the hydrocarbon fuel successively through each of the modules in an axial direction through the tubular reactor to produce the hydrogen rich gas.

23 Claims, 3 Drawing Sheets

U.S. PATENT DOCUMENTS

| | | |
|---|---|---|
| 5,997,594 A | 12/1999 | Edlund et al. |
| 6,033,793 A | 3/2000 | Woods et al. |
| 6,086,839 A | 7/2000 | Autenrieth et al. |
| 6,126,908 A * | 10/2000 | Clawson et al. ............. 422/190 |
| 6,140,266 A * | 10/2000 | Corrigan et al. ............. 502/439 |
| 6,159,434 A * | 12/2000 | Gonjo et al. ................. 422/191 |
| 6,180,846 B1 * | 1/2001 | Dandekar et al. ........... 585/443 |
| 6,238,815 B1 * | 5/2001 | Skala et al. ................... 429/17 |
| 6,468,480 B1 * | 10/2002 | Clawson et al. ............. 422/211 |
| 6,576,203 B2 * | 6/2003 | Abe et al. .................... 422/211 |
| 6,896,709 B1 * | 5/2005 | Han et al. ................... 48/127.9 |
| 2002/0083646 A1 | 7/2002 | Deshpande et al. |
| 2002/0088740 A1 | 7/2002 | Krause et al. |
| 2002/0090326 A1 | 7/2002 | Deshpande |
| 2002/0090327 A1 | 7/2002 | Deshpande |
| 2002/0090328 A1 | 7/2002 | Deshpande |
| 2002/0090334 A1 | 7/2002 | Stevens et al. |
| 2002/0098129 A1 | 7/2002 | Martin et al. |

* cited by examiner

COMPACT FUEL PROCESSOR FOR PRODUCING A HYDROGEN RICH GAS

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multistep processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. In one illustrative embodiment of the present invention, the apparatus for converting hydrocarbon fuel into hydrogen rich gas includes a plurality of modules stacked end-to-end along a common axis. Each module includes a shell having an interior space defining a passageway for the flow of gas from a first end of the shell to a second end of the shell opposite the first end. The apparatus further includes a processing core being contained within the interior space for effecting a chemical, thermal, or physical change to a gas stream passing through the processing core. It is a preferred aspect of the present invention that the modules are cylindrical in shape. In one illustrative and preferred embodiment, each module includes an annular lip at either the first end or the second end of the shell and an annular recessed portion at the opposite end of the shell. This is designed such that the annular lip of one module is receivable into the annular recess of the adjacent module.

Depending upon the reaction taking place within the module, each module may include an annular layer of thermally insulating material disposed between the shell and the respective processing core. In a similar manner, a module may include a porous support member, such as screen, mesh, perforated plate, or porous sintered plate. Such a porous support member may be included so as to support and contain the contents of the module, particularly granular catalyst materials.

As noted above and described herein, the apparatus of the present invention is used to carry out a series of reactions that converts hydrocarbon fuel to hydrogen rich gas. In one illustrative embodiment of such an apparatus, the first module preferably has a processing core that includes a partial oxidation catalyst or alternatively a steam reforming catalyst or alternatively an autothermal reforming catalyst or alternatively combinations and/or mixtures of such catalysts. A second module positioned adjacent to the first module is preferably designed so that the processing core of the second module includes a first heat exchanger. Such a heat exchanger may be a fin-typed heat exchanger, tubing heat exchanger, heat pipe, or similar means that are capable of exchanging heat.

Within the plurality of modules, a third module is preferably positioned adjacent to the second module, the processing core of the third module including a desulfurizing agent. A wide variety of desulfurizing agents may be used but preferably the desulfurizing agent includes zinc oxide. A fourth module positioned adjacent to and in fluid communication with the third module includes a processing core containing a water gas shift catalyst. One of skill in the art should understand and appreciate that the water gas shift catalyst may be a low temperature water gas shift catalyst that includes a catalyst material selected from copper, copper oxide, zinc, platinum, rhenium, palladium, rhodium, and gold and combinations and mixtures of these an similar materials. Alternatively, the water gas shift catalyst is a high temperature water gas shift catalyst that includes a catalyst material selected from ferric oxide, chromic oxide, copper, iron silicide, platinum, palladium and other platinum group members, and combinations and mixtures of these and similar materials.

The apparatus is further designed to include within the plurality of modules a fifth module positioned adjacent to and in fluid communication with the fourth module. The processing core of the fifth module includes a second heat exchanger. Such a heat exchanger may include a fin-typed heat exchanger, tubing heat exchanger, heat pipe, or similar means that are capable of exchanging heat.

The plurality of modules further includes a sixth module positioned adjacent to the fifth module with which it is in fluid communication. The processing core of the sixth module includes a carbon monoxide oxidation catalyst that preferably includes a material selected from platinum, palladium, iron, chromium, manganese, iron oxide, chromium oxide, manganese oxide, ruthenium, , gold, cerium, lanthanum, and combinations and mixtures of these and similar compounds.

The present invention also includes a process for converting hydrocarbon fuel into a hydrogen rich gas. One such illustrative process utilizes the apparatus disclosed herein. Such a process generally includes providing a fuel processor having a plurality of modules stacked end-to-end along a common axis, and feeding the hydrocarbon fuel successively through each of the above described modules in an axial direction through a tubular reactor to produce the hydrogen rich gas.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describe a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
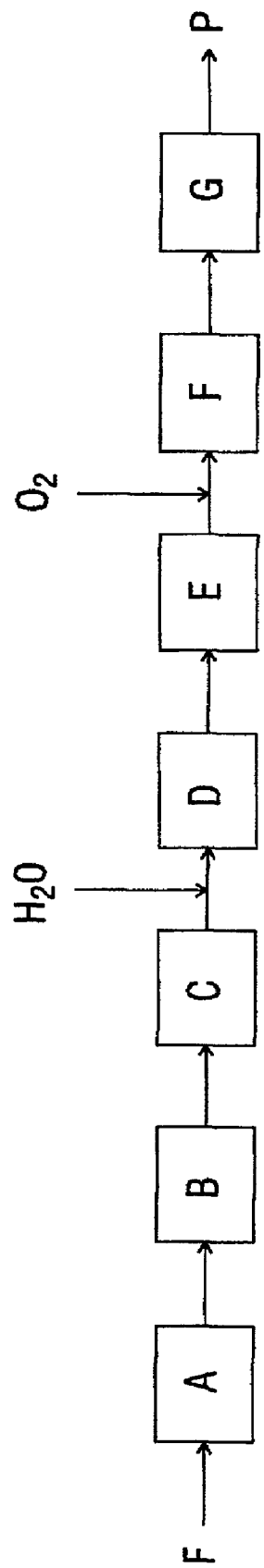
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants trough the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \qquad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O+CO \rightarrow H_2+CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO+\tfrac{1}{2}O_2 \rightarrow CO_2 \qquad (V)$$

$$H_2+\tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Figure 2:
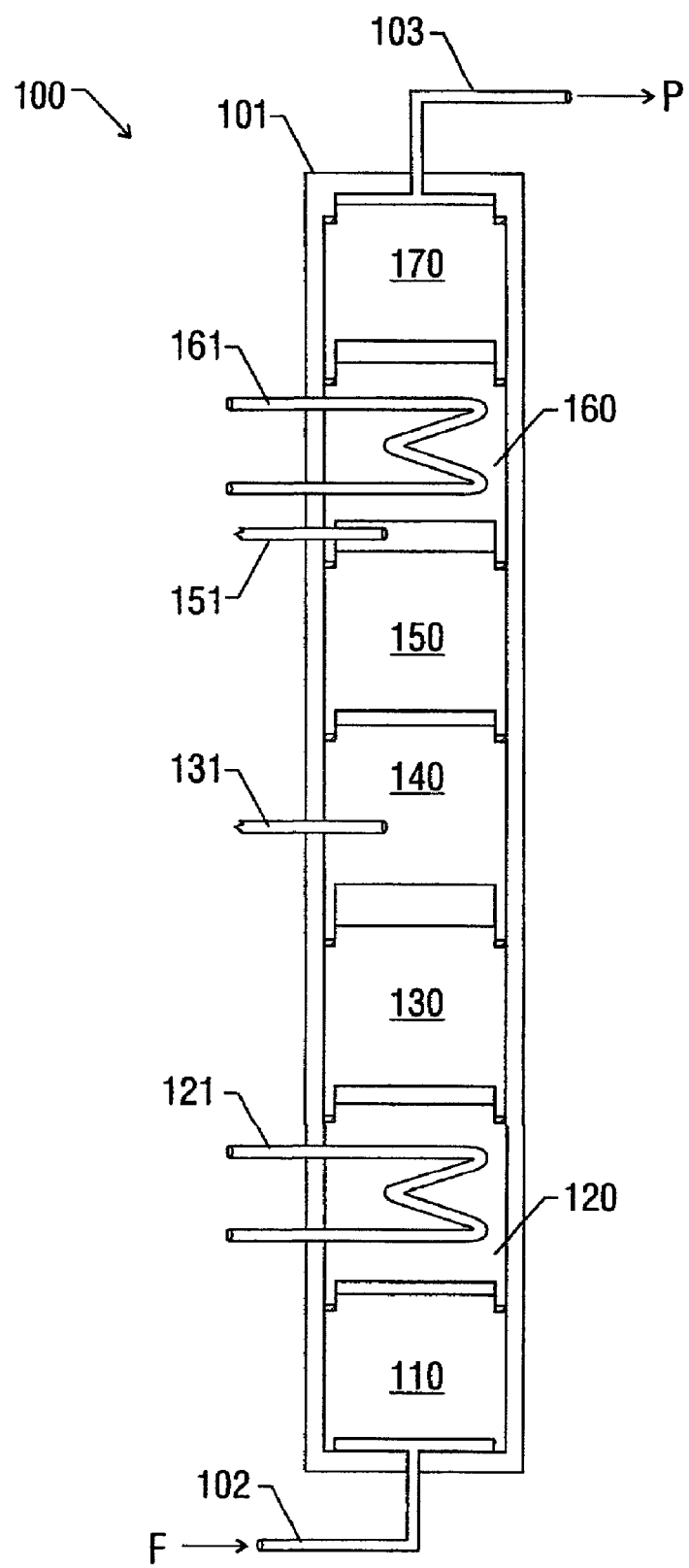
FIG. 2 illustrates one illustrative embodiment of the compact fuel processor apparatus of the present invention.

In one illustrative embodiment of the present invention, the fuel processor is of modular construction with individual modular units, which are separable, rearrangeable, and individually replaceable. Referring to FIG. 2, the fuel processor 100 of the present invention includes a series of individual modules (110, 120, 130, 140, 150, 160 and 170). The modular units may be used in any orientation, e.g., vertical or horizontal orientation, and is adapted to be used in conjunction with a fuel cell such that the hydrogen rich product gas of the reactor described herein is supplied directly to a fuel cell as a feed stream. While the modules can have any cross sectional configuration, such as circular, rectangular, triangular, etc., a circular cross section is preferred with the fuel processor 100 being of a generally tubular shape.

The modules are constructed in accordance with the description given below in connection with FIG. 3, unless indicated otherwise. The modules can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed. The operating pressure of the fuel processor depends upon the delivery pressure required by the fuel cell. For fuel cells operating in the 1 to 20 kW range an operating pressure of 0 to about 100 psig is generally sufficient. The modules are of such dimensions so as to safely contain the reaction at the desired operating pressures and temperatures.

Fuel processor 100 as shown in FIG. 2 effects the process diagrammatically illustrated in FIG. 1. Feed stream F is introduced through inlet pipe 102 and product gas P is drawn off via outlet pipe 103. The apparatus 100 includes several modules that may be stacked to form a modular assembly that can be modified by the replacement of individual modules. Each module performs a separate operational function and is generally configured as shown in FIG. 2. Module 110 is the autothermal reforming module corresponding to process step A of FIG. 1. Module 120 is a cooling step corresponding to process step B of FIG. 1. In this illustrative embodiment, heat exchanger 121 is shown as a general heat sink for Module 120. Module 130 is a purifying module corresponding to process step C of FIG. 1. Module 140 is an optional mixing step corresponding to process step D of FIG. 1. Feed nozzle 131 provides an optional water stream feed to Module 140 to aid in driving the water gas shift reaction (Equation IV) of Module 150. Module 150 is a water gas shift module corresponding to process step E of FIG. 1. Feed nozzle 151 provides a source for oxygen to process gas for the oxidation reaction (Equation V) of Module 170. Module 150 also contains a heat exchanger (not shown) positioned within or surrounding the catalyst bed so as to maintain a desired water gas shift reaction temperature. Module 160 is a cooling step corresponding to process step F of FIG. 1. In this illustrative embodiment, heat exchanger 161 is shown as a general heat sink for Module 160. Module 170 is an oxidation step corresponding to process step G of FIG. 1. Module 170 also contains a heat exchanger (not shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Figure 3:
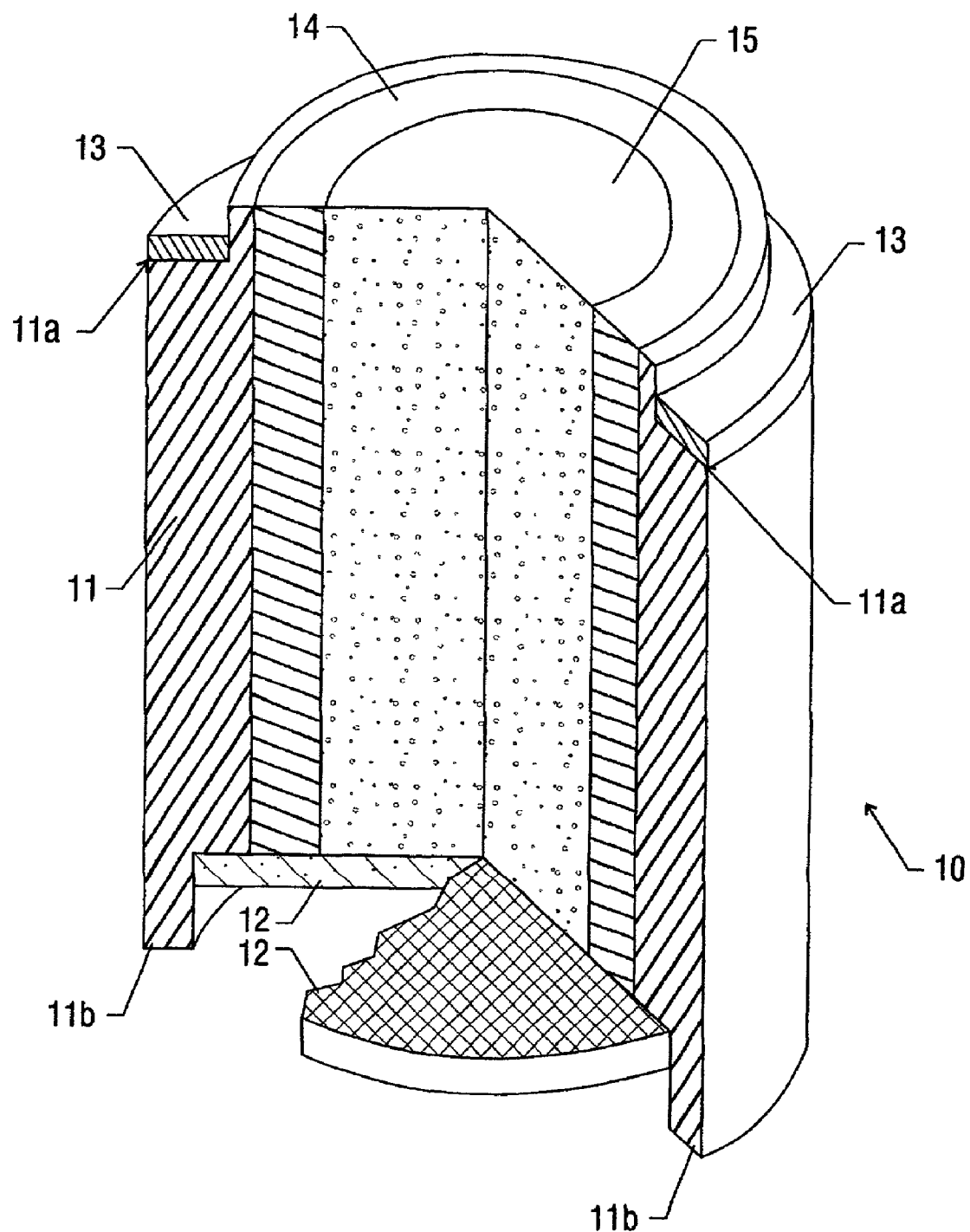
FIG. 3 is a cut-away partly sectional perspective view of a module employed in the compact fuel processor apparatus.

FIG. 3 illustrates an individual module 10 that includes a shell 11, an optional support plate 12, an annular gasket 13, an optional insulative material 14, and a processing core 15. Shell 11 can have any cross sectional shape such as circular, square, triangular, etc. However shell 11 is preferably a cylindrical shaped tubular member having an axial bore. Shell 11 is preferably fabricated from a material such as stainless steel, Inconel, Incoloy, or Hastelloy for the reasons stated above. Shell 11 includes an annular upper recess 11*a* and an annular lower lip 11*b*, which serve as mating features to facilitate the stacking of two or more modules. The upper recess 11*a* is adapted to receive gasket 13 and lower lip 11*b*.

The optional support plate 12 is preferably fabricated from, for example, a screen, mesh, perforated plate, porous sintered metal plate, and the like. It can be fabricated from metal alloys such as stainless steel, Inconel, Incoloy, or Hastelloy, or from a suitable ceramic material. The support plate 12 not only provides support for the components contained within the module 10, it also serves as a gas distributor to distribute the gas flow though the reactor evenly throughout the cross section of the reactor. Even distribution of the gas facilitates optimal performance of the reactor.

Gasket 13 is a ring shaped piece to help seal the joint between modules and prevent gas leaks. It can be fabricated from materials such as graphite, ceramic, copper, or other materials capable of withstanding the operating conditions of the reactor.

Optional internal insulator 14 is disposed within the axial bore of cylindrical shell 11 and comprises a cylindrical piece with an axial bore. Insulator 14 minimizes heat loss to the environment that could reduce the system efficiency. It shortens start-up time and reduces heat transfer to the shell 11 and the environment. Internal insulator 14 can be fabricated from any material suitable for the purposes described herein. Preferred materials include interam intumescent fibrous ceramic mat; saffil alumina fibrous mat; flexible, knitted steel wire mat (such as Wire Wrap); and other flexible ceramic mats made from alumina or silica fibers and similar such materials.

Processing core 15 is contained within the axial bore of shell 11, and, if the internal insulator 14 is present, also within the bore of the internal insulator. Processing core 15 accomplishes the function of the module and can be a catalyst, adsorbent, absorbent, heat exchanger, or inert material.

Such a skilled person in the art should also appreciate that the present invention also encompasses the following illustrative embodiments. One such illustrative embodiment includes an apparatus for converting hydrocarbon fuel into a hydrogen rich gas, comprising a plurality of modules stacked end-to-end along a common axis, wherein each module includes a shell having an interior space defining a passageway for the flow of gas from a first end of the shell to a second end of the shell opposite the first end, and a processing core being contained within the interior space for effecting a chemical, thermal, or physical change to a gas stream passing axially therethrough. Such an apparatus may include an outer housing within which the plurality of modules are disposed. Whereas this apparatus is intended to encompass numerous shapes and orientations, a preferred aspect of the present apparatus is for the optional outer housing and the modules to be cylindrical in shape. Numerous means exist for connecting the modules together to form the apparatus of the present invention. However, a preferred aspect of the present invention is for each module includes an annular lip at either the first end or the second end of the shell and an annular recessed portion at the opposite end of the shell, whereby the annular lip of one module is receivable into the annular recess of the adjacent module. A preferred aspect of the present invention is for one or more of the modules to include an annular layer of thermally insulative material disposed between the shell and the respective processing core. At least one module includes a porous support member mounted in proximity to one end of the shell, where the porous support member is selected from the group consisting of a screen, mesh, perforated plate, and porous sintered plate.

Another illustrative embodiment of the present invention is an apparatus for converting hydrocarbon fuel into a hydrogen rich gas, comprising a plurality of modules stacked end-to-end along a common axis, wherein each module includes a shell having an interior space defining a passageway for the flow of gas from a first end of the shell to a second end of the shell opposite the first end, and a processing core being contained within the interior space for effecting a chemical, thermal, or physical change to a gas stream passing axially therethrough. The first module contains a processing core that includes a partial oxidation catalyst. The partial oxidation catalyst can include a metal such as platinum, palladium, rhodium, ruthenium, nickel, cobalt, or any combination thereof. Optionally, the first module may also contain a steam reforming catalyst. The steam reforming catalyst can include a metal such as platinum, palladium, rhodium, ruthenium, iridium, nickel, potassium, or any combination thereof. The partial oxidation catalyst may be supported on a material such as magnesia, alumina, titania, zirconia, or silica. The steam reforming catalyst may be supported on a material such as magnesia, alumina, silica, zirconia, or magnesium aluminate. The second module, which is positioned adjacent to the first module, contains a heat exchanger inside the processing core for cooling the gas stream produced from the first module. The third module, which is positioned adjacent to the second module, contains a desulfurization agent, such as zinc oxide, inside the processing core. Optionally, a fourth module may be included, positioned adjacent to the third module, and would contain an inert material such as ceramic beads for mixing water and components of the process gas stream. If no fourth module is included in the apparatus, water should be added prior to the fifth module. The fifth module, which is positioned adjacent to the fourth module or the third module if no fourth module is included, contains a water gas shift catalyst inside the processing core. It is intended by the present invention that a low temperature water gas shift catalyst, a high temperature water gas shift catalyst, or a combination of the two can be utilized in the fifth module. Possible low temperature water gas shift catalysts include copper, copper oxide, zinc, platinum, rhenium, palladium, rhodium, and gold. Possible high temperature water gas shift catalyst includes a material selected from the group consisting of ferric oxide, chromic oxide, copper, iron silicide, platinum, and palladium. The fifth module also includes a heat exchanger positioned within the water gas shift catalyst bed for maintaining a desired shift reaction temperature range. The sixth module, which is positioned adjacent to the fifth module, contains a heat exchanger inside the processing core for cooling the gas stream produced by the fifth module. The seventh module, which is positioned adjacent to the sixth module, contains a carbon monoxide oxidation catalyst in the processing core. Such a carbon monoxide oxidation catalyst can be platinum, palladium, iron, chromium, manganese, iron oxide, chromium oxide, manganese oxide, ruthenium, palladium, gold, or any combination thereof. The seventh module also includes a heat exchanger positioned within the water gas shift catalyst bed for maintaining a desired oxidation reaction temperature range.

Yet another illustrative embodiment for the present invention is a process for converting hydrocarbon fuel into a hydrogen rich gas by using a fuel processor having a plurality of modules stacked end-to-end along a common axis, and by feeding the hydrocarbon fuel successively through each of the modules in an axial direction to produce the hydrogen rich gas. A first module, which may be designed according to the previous illustrative embodiment for partial oxidation and steam reforming of the hydrocarbon fuel, operates at a temperature ranging from about 550° C. to about 900° C. A second module, which may be designed according to the previous illustrative embodiment, then cools the first module effluent to a temperature of from about 200° C. to about 600° C. The third module, which may be designed according to the previous illustrative embodiment, desulfurizes the second module effluent using zinc oxide as a desulfurizing agent. The optional fourth module, which may be designed according to the previous illustrative embodiment, mixes water with the third module effluent to produce a feed for the fifth module. The fifth module, which may be designed according to the previous illustrative embodiment, reacts water and the carbon monoxide contained in process stream in a water gas shift reaction to reduce the carbon monoxide concentration leaving the fifth module. A preferred aspect of the present invention is that the fifth module operates at a temperature ranging from about 150° C. to about 400° C. The sixth module, which may be designed according to the previous illustrative embodiment, cools the fifth module effluent to a temperature of from about 90° C. to about 150° C. The seventh module, which may be designed according to the previous illustrative embodiment, oxidizes at least some carbon monoxide in the process gas stream to produce the hydrogen rich gas. A preferred aspect of the present invention is that the seventh module operates at a temperature of from about 90° C. to about 150° C. One additional aspect of the present invention is the potential for heat integration. In terms of the present embodiment, heat exchange in the second module, fifth module, sixth module, and seventh module may be utilized to preheat the hydrocarbon feed to the apparatus. It is intended that the present invention be able to reduce the carbon monoxide concentration in the hydrogen rich gas to less than 50 ppm.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An apparatus for converting hydrocarbon fuel into a hydrogen rich gas, comprising a plurality of modules stacked end-to-end along a common axis, wherein each module of the plurality of modules includes:
   a shell having an interior space defining a passageway for the flow of a gas stream from a first end of the shell to a second end of the shell opposite the first end, and a processing core being contained within the interior space for effecting a chemical, thermal, or physical change to the gas stream passing axially therethrough; and
   wherein the plurality of modules includes a first module, wherein the hydrocarbon fuel is fed first into the first module wherein the first module is stacked at a first end of the common axis, and, wherein the processing core of the first module includes a partial oxidation catalyst.

2. The apparatus as described in claim 1, wherein each module of the plurality of modules includes an annular lip at either the first end or the second end of the shell and an annular recessed portion at the opposite end of the shell, and wherein the annular lip of one module is receivable into the annular recess of the adjacent module.

3. The apparatus as described in claim 1, wherein at least one module of the plurality of modules includes an annular layer of thermally insulative material disposed between the shell and the respective processing core.

4. The apparatus as described in claim 1, wherein at least one module of the plurality of modules includes a porous support member mounted in proximity to the first end of the shell.

5. The apparatus as described in claim 1, wherein at least one module of the plurality of modules includes a porous support member mounted in proximity to the second end of the shell.

6. The apparatus as described in claim 5, wherein the porous support member is selected from the group consisting of a screen, mesh, perforated plate, and porous sintered plate.

7. The apparatus as described in claim 1, wherein the first module also includes a steam reforming catalyst.

8. The apparatus as described in claim 7, wherein the steam reforming catalyst includes a metal selected from the group consisting of platinum, palladium, rhodium, ruthenium, indium, nickel, potassium, and combinations thereof.

9. The apparatus as described in claim 8, wherein the metal of the steam reforming catalyst is supported on a material selected from the group consisting of magnesia, alumina, silica, zirconia, and magnesium aluminate.

10. The apparatus as described in claim 1, wherein the partial oxidation catalyst includes a metal selected from the group consisting of platinum, palladium, rhodium, ruthenium, nickel, cobalt, and any combinations thereof.

11. The apparatus as described in claim 10, wherein the metal of the partial oxidation catalyst is supported on a material selected from the group consisting of magnesia, alumina, titania, zirconia, and silica.

12. The apparatus as described in claim 1, wherein the plurality of modules includes a second module, wherein the processing core of the second module includes a first heat exchanger for cooling the gas stream.

13. The apparatus as described in claim 1, wherein the plurality of modules includes a third module, wherein the processing core of the third module includes a desulfurization agent.

14. The apparatus as described in claim 13, wherein the desulfurization agent includes zinc oxide.

15. The apparatus as described in claim 1, wherein the plurality of modules includes a fifth module, wherein the processing core of the fifth module includes: a water gas shift catalyst bed; and a heat exchanger positioned within the water gas shift catalyst bed for maintaining a desired shift reaction temperature range.

16. The apparatus as described in claim 15, wherein the water gas shift catalyst is a low temperature water gas shift catalyst.

17. The apparatus as described in claim 16 wherein the low temperature water gas shift catalyst includes a material selected from the group consisting of copper, copper oxide, zinc, platinum, rhenium, palladium, rhodium, and gold.

18. The apparatus as described in claim 15, wherein the water gas shift catalyst is a high temperature water gas shift catalyst.

19. The apparatus as described in claim 18, wherein the high temperature water gas shift catalyst includes a material selected from the group consisting of ferric oxide, chromic oxide, copper, iron silicide, platinum, and palladium.

20. The apparatus as described in claim 1, wherein the plurality of modules includes a sixth module, wherein the processing core of the sixth module includes a second heat exchanger for cooling the gas stream.

21. The apparatus as described in claim 1, wherein the plurality of modules includes a seventh module, wherein the processing core of the seventh module includes: a carbon monoxide oxidation catalyst bed; and a heat exchanger positioned within the carbon monoxide oxidation catalyst bed for maintaining a desired oxidation reaction temperature range.

22. The apparatus as described in claim 21, wherein the seventh module is designed to introduce an oxygen-containing stream to the gas stream prior to contact with the carbon monoxide oxidation bed.

23. The apparatus as described in claim 21, wherein the carbon monoxide oxidation catalyst bed includes a material selected from the group consisting of platinum, palladium, iron, chromium, manganese, iron oxide, chromium oxide, manganese oxide, ruthenium, palladium, gold, and any combinations thereof.

* * * * *